July 8, 1924.
W. L. STUBBS
HOIST FOR MOTOR VEHICLES
Filed Nov. 17, 1922
1,500,284
2 Sheets-Sheet 1
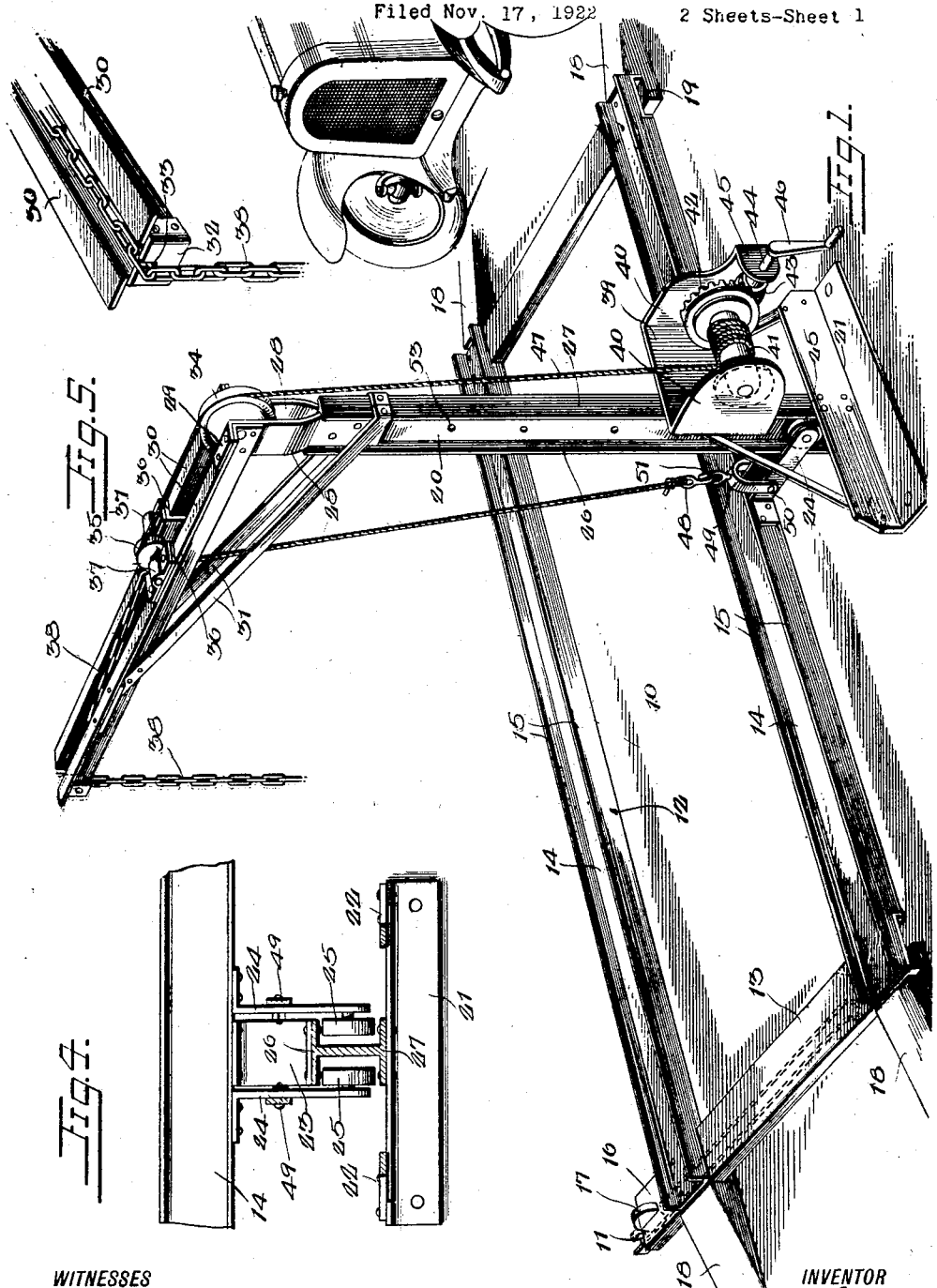
WITNESSES
George A. Myers
INVENTOR
W. L. STUBBS,
BY
ATTORNEYS

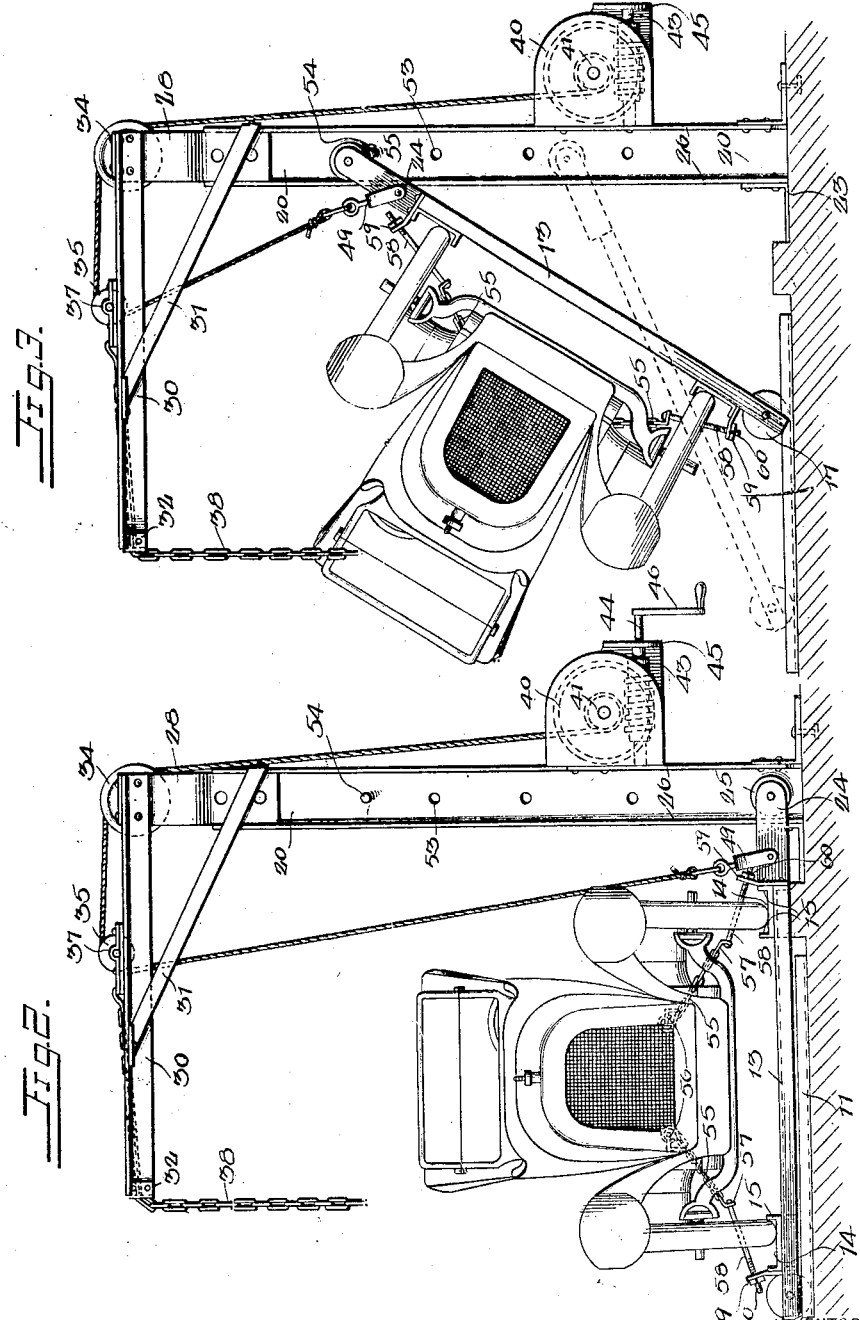

Patented July 8, 1924.

1,500,284

UNITED STATES PATENT OFFICE.

WILLIAM L. STUBBS, OF NORFOLK, VIRGINIA.

HOIST FOR MOTOR VEHICLES.

Application filed November 17, 1922. Serial No. 601,521.

*To all whom it may concern:*

Be it known that I, WILLIAM L. STUBBS, a citizen of the United States, and a resident of Norfolk, in the county of Norfolk and State of Virginia, have invented certain new and useful Improvements in Hoists for Motor Vehicles, of which the following is a specification.

This invention relates to a hoist for motor vehicles.

The general object of the invention is to provide an apparatus which may be inexpensive to install in a garage or the like and which will serve in an efficient manner for lifting or tilting a motor vehicle or the like in such a manner that easy access may be had to the under parts of the motor vehicle.

It is also an important object of the invention that the apparatus require a minimum of space for its installation and operation.

A still further object of the invention is that the apparatus may serve to vertically lift a motor vehicle or parts thereof if so desired.

It is further within the scope of the objects of the invention that the apparatus operate in a positive and certain manner.

Other objects and objects relating to details of construction will hereinafter appear in the detailed description to follow.

The invention is illustrated by way of example in the accompanying drawings, in which, Figure 1 is a perspective view of the apparatus when fully assembled and also showing a motor vehicle in position preparatory to being placed upon the supporting frame of the apparatus.

Figure 2 is a view in end elevation of the apparatus and showing the motor vehicle when placed upon the supporting frame and anchored to said frame.

Figure 3 is a view similar to that of Figure 2 and showing in full lines the automobile and supporting frame when one side of the frame is being raised for tilting the automobile and also showing in dotted lines the relative position of the frame during the moment when the same is being returned to its initial position.

Figure 4 is a detail view illustrating the manner in which the guide rollers are positioned with respect to the guide post.

Figure 5 is a detailed view in perspective illustrating the manner in which the position of the movable sheave associated with the apparatus may be adjusted.

Like reference numbers refer to similar parts throughout the specification.

Referring to the drawings more particularly, 10 may indicate the floor of a garage or the like upon which is mounted a pair of channel-shaped rails 11 upon which is mounted a frame generally designated by the reference character 12. This frame preferably comprises a pair of cross ties 13 and a pair of supporting rails 14 which extend between said cross ties 13. The rails 14 are preferably I-beams in order that they may have the required strength and also that each rail may present a pair of flanges 15 between which a wheel of a motor vehicle may move. The cross ties 13 are preferably channel-shaped and inverted as shown. Each cross tie 13 is extended from one side of the frame as at 16 and this extended portion is provided with a suitable slot arranged longitudinally thereof adapted to receive a roller 17, said roller being adapted to move in the associated channel member 11. The channel members 11 therefore afford a track means for the rollers 17. At each end of the frame 12 there is provided a pair of approaches 18 which may be in the form of a block as shown and each block having a forward offset portion 19 which is adapted to support the associated cross tie 13. When the frame is positioned as shown in Figure 1 the greater weight thereof is supported by the approaches 18. The rail 14 adjacent the rollers 17 may be referred to as the outside rail of the frame, while the other rail may be referred to as the inside rail of the frame.

Adjacent the inside rail 14 of the frame 12 there is positioned a post generally indicated by the reference numeral 20, said post being in the form of an I-beam. This post may have secured thereto a suitable angle plate 21 which may be braced by the members 22. The angle plate 21 may serve to hold the post 20 in its vertical position and suitable bolts may be extended from the floor through the angle plate 21 to secure the same. A similar plate 23 may be placed upon the other side of the post 20 to further brace the same.

Upon the inside rail 15 there is secured a pair of arms 24, said arms extending toward the post 20 and adapted to receive the post therebetween. The outer end of each arm has journaled thereon a roller 25. The inside flange 26 of the post 20 serves as a track for each of the rollers 25 to move upon when the inner side of the frame is being lifted and the outside flange 27 of said I-beam serves as a track for each of the rollers 25 during the period the frame is being returned to its initial position. This particular operation will hereinafter be more fully described.

To the upper end of the post 20 there is secured a pair of extension members 28, each member terminating at its upper end in an outwardly disposed portion 29 to facilitate securing thereto the inner end of an angle bar 30. The two angle bars 30 extend at right angles to the post 20 and are braced by the members 31. The outer ends of the angle members 30 are secured together by a U-shaped plate member 32 which is provided in its upper end with a notch 33, the purpose of which will later become apparent.

Between the upper ends of the members 28 there is journaled a sheave 34 and slidable upon the members 30 there is supported a second sheave 35. The sheave 35 is slidably supported upon the members 30 by means of a pair of angle members 36, one being movable longitudinally of each of the members 30 and each member 36 carrying a suitable bearing cap 37 whereby to journal the stub shaft supporting the sheave 35. The forward ends of the members 36 are preferably secured together and from this securing means there may be extended a chain 38. By bringing a link of the chain to engage the notch 33 of the plate 32 it is obvious the sheave 35 may be held against movement in an inward direction upon the members 30. Also it is apparent that the position of this sheave may be adjusted. A person standing upon the floor 10 can easily reach the free end of the chain 38 and adjust the position of the sheave 35. In fact the members 36 may be termed a carrier for the sheave 35 and the members 30 rails for supporting said carrier.

Upon the outer side of the post 20 there may be secured a substantially U-shaped plate member 39 and between the leg portions 40 thereof there is journaled a winding drum 41 which carries at its one end a gear wheel 42 which is in constant mesh with the worm gear 43 supported by a shaft 44. The gear wheel 42 and worm 43 constitute a self locking gear arrangement of well known type. The shaft 44 may be journaled at its one end in the bridge portion of the U-shaped plate member 39 and its other end in the extension 35 of the associated leg portion 40 of the member 39. The shaft 44 may be provided with a suitable handle 46 whereby the same may be manually rotated. The cable 47 may have its one end secured to the drum 41 and this cable may be placed over the sheaves 34 and 35 and have its other end secured to a hook 48.

A U-shaped clip 49 is provided which is adapted to straddle the two arms 24 and this member has each leg pivotally secured as at 50 to the associated arm 24. The clip 49 may be provided with an eye-bolt 51 by which the same may be connected with the hook 48.

The bridge portion of the I-beam or post 20 should be provided with a plurality of longitudinally arranged openings 53 and a pin such as shown at 54 should be provided which is adapted to be extended through either one of the openings 53. The purpose of this pin will hereinafter be described.

Referring to Figures 2 and 3, it will be noted that each side of the motor vehicle as shown upon the supporting frame 12 is anchored to said supporting frame and each anchor preferably consists in a chain 55 which may be formed with a hook at its one end so that the same may be secured to the side frame member of the vehicle as indicated at 56. The other end of each chain may terminate in a link 57 which may be formed with an eye adapted to receive a bolt 58. This bolt may be extended through the one end of a clip 59 secured to a rail 14 of the frame 12 and a nut 60 carried upon the end of each bolt may be utilized for tensioning this anchor and thereby to secure the motor vehicle in position upon the frame. Any number of these anchors may be used, preferably two upon each side of the motor vehicle.

In the use of the present device, assuming that the motor vehicle is placed upon the supporting frame 12 as illustrated in Figure 2 and the same anchored as likewise illustrated in this figure to said frame, the cable 47 is attached at its one end to the one side of the frame 12 as illustrated in each of the Figures 1 and 3 and now the drum 41 may be rotated through the means of the crank 46 whereby to draw upwardly upon the inside of the frame 12. Upon this occurring the rollers 25 will engage upon the inner flange 26 of the associated post or I-beam 20 and as the inner side of this frame is gradually lifted these rollers bearing against its inner flange will cause sufficient pull upon the other side of the frame to move the same inwardly. The outside of the frame 14 during this movement is supported by the rollers 17 upon the tracks 11. This particular movement of the frame is illustrated in Figure 3 of the drawings. Upon the motor vehicle being tilted or one side thereof lifted to the desired position, the pin 54 may be placed beneath the arms 24 and thereby insure that this side of the frame is held in its lifted position. Also the cog wheel 42 may be of such a construction that the same will cooperate with the worm 43 to at all times resist movement of the drum 41 except when operated through the means of the crank 46 and thus in this way hold the frame 12 with its one side lifted while said frame is supporting the motor vehicle.

When it is desired to return the motor vehicle to its initial position the pin 54 is removed and the crank 46 rotated in order to permit downward movement of the one side of the frame 12. Upon this occurring the frame will assume the dotted line position illustrated in Figure 3 and the rollers 25 will engage upon the outer flange 27 of the I beam 20 and this flange 27 will cooperate with the rollers 25 to cause the frame to move outwardly with respect to the post 20 and thus the frame will return to its initial position illustrated in Figure 1 of the drawings.

It should be here mentioned that the position of the movable sheave 35 should be adjusted previous to elevating one side of the frame 12. Furthermore it might be pointed out that the crank shaft 44 associated with the drum 41 may be extended upon its inner side so that a crank may be applied thereto and this shaft then operated from either side of the post 20.

In case it is desired to lift one end of the motor vehicle or to lift any part therefrom the cable 47 may be utilized for this purpose. The sheave 35 is brought to the position desired, that is directly over the object to be lifted and this sheave is held in this position by the chain 38. Any suitable means may be employed to connect the hook 51 of the cable 47 to the object to be lifted and then the crank 46 may be rotated for lifting this object. If desired, the members 30 may be further supported in order to sustain the object to be lifted or these members might be extended in order to permit a wider working range of the device when used in connection for lifting objects from the associated floor.

While I have herein shown and described the preferred form of my invention, it is to be understood that various changes and modifications may be made herein without departing from the spirit of the invention or the spirit and scope of the appended claims.

I claim:

1. In an apparatus of the character described, a frame, means for supporting the frame to permit transverse movement thereof, a post positioned at one side of the frame and at a point central to the length of the frame, a connection between the last named side of the frame and the post, said connection including roller means to permit free upward movement of this side of the frame, and means for lifting the last named side of the frame, said means being adapted to exert a pull from a point occurring above the frame and inwardly spaced with relation to the post.

2. In an apparatus of the character described, a frame, means for supporting the frame to permit transverse movement thereof, a post adjacent one side of the frame and extending in vertical relation to the frame, an arm extending from the last named side of the frame having a roller journaled upon the free end thereof and said roller disposed adjacent one side of the post, means whereby the last named side of the frame may be lifted, said means being adapted to exert a pull from a point disposed in spaced relation with respect to the inner side of the post, and means carried by the post upon which said roller may move and resist outward movement of the associated side of the frame with respect to said post.

3. In an apparatus of the character described, a frame, means for supporting the frame to permit transverse movement thereof, a post adjacent one side of the frame and extending in vertical relation to the frame, an arm extending from the last named side of the frame having a roller journaled upon the free end thereof and said roller disposed adjacent one side of the post, means whereby the last named side of the frame may be lifted, said means being adapted to exert a pull from a point disposed in spaced relation with respect to the inner side of the post, means carried by the post upon which said roller may move and resist outward movement of the associated side of the frame with respect to said post, and means carried by said post adapted to serve as a track upon which the roller may move during the lowering movement of the last named side of the frame.

4. In an apparatus of the character described, a frame, means for supporting the frame adapted to permit transverse movement thereof, a post positioned upon one side of the frame and extending vertically with relation to the frame, said post being in the form of an I-beam, a pair of arms extending from the last named side of the frame, a roller journaled at the free end of each arm and disposed within the associated channel of said I-beam, and means for lifting the side of frame associated with said post, said means being adapted to exert a pull from a point inwardly spaced with respect to said post whereby upon the upward movement of said side of the frame the rollers will engage upon the inner flanges of the I-beam, and upon downward movement of said side of the frame, said rollers will move upon the outer flanges of said frame.

5. In an apparatus of the character described, a frame, roller means for supporting said frame to permit transverse movement thereof, a post arranged adjacent one side of the frame, said post being in the form of an I-beam, a pair of arms extending from the last named rail and each arm having a roller journaled upon its free end and which is disposed in the associated channel of said I-beam, a pair of track members disposed at right angles to said post and at a point above said frame, a sheave carried by said track members, means for adjusting the position of said sheave, and a cable extending over said sheave and having its one end connected to the side of frame associated with said post whereby power may be applied for lifting the last named side of the frame.

6. In an apparatus of the character described, a frame, roller means for supporting said frame to permit transverse movement thereof, a post arranged adjacent one side of the frame, said post being in the form of an I-beam, a pair of arms extending from the last named rail and each arm having a roller journaled upon its free end and which is disposed in the associated channel of said I-beam, a pair of track members disposed at right angles to said post and at a point above said frame, a sheave carried by said track members, means for adjusting the position of said sheave, a cable extending over said sheave and having its one end connected to the side of frame associated with said post, a second sheave carried at the upper end of said post over which said cable may pass, and a winding drum to which the other end of said cable may be connected, and said winding drum being adapted to be rotated whereby to lift the side of said frame to which the cable is connected.

7. In an apparatus of the character described, a pair of rails, a sheave movable thereon, a chain having its one end connected to said sheave, and means carried by said rails adjacent similar ends thereof whereby the length of said chain may be adjusted and thus to adjust the position of said sheave upon said rails.

WILLIAM L. STUBBS.